Feb. 28, 1928.
C. C. FARMER ET AL
1,660,484
ANGLE COCK DEVICE
Filed April 23, 1927
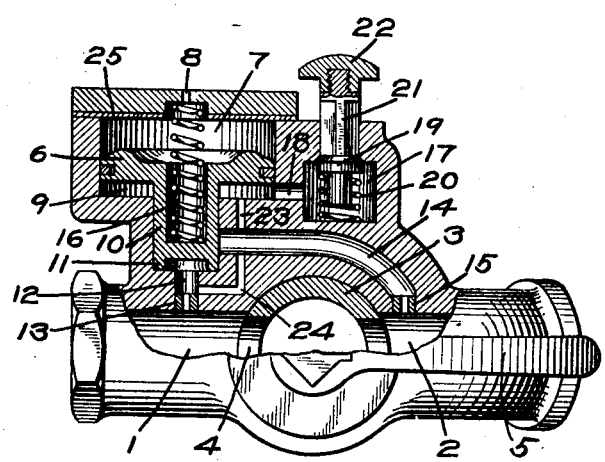
INVENTORS
CLYDE C. FARMER
THOMAS H. THOMAS
BY *Wm. M. Cady*
ATTORNEY Patented Feb. 28, 1928.

1,660,484

UNITED STATES PATENT OFFICE.

CLYDE C. FARMER, OF PITTSBURGH, AND THOMAS H. THOMAS, OF EDGEWOOD, PENNSYLVANIA, ASSIGNORS TO THE WESTINGHOUSE AIR BRAKE COMPANY, OF WILMERDING, PENNSYLVANIA, A CORPORATION OF PENNSYLVANIA.

ANGLE-COCK DEVICE.

Application filed April 23, 1927. Serial No. 185,976.

This invention relates to fluid pressure brakes and more particularly to an angle cock device, such as employed to control communication through the brake pipe of a fluid pressure brake system.

If the usual angle cock device in the brake pipe at one end of a car is turned to closed position, the operator's control of the brakes on the train back of the closed angle cock is lost, so that under such conditions if the operator makes a brake pipe reduction, the brakes will be applied only on the cars ahead of the closed angle cock, and the train will not have a sufficient retarding force to stop in a required distance. As a result, the train may run past signals set at danger, or across closed crossings or even be wrecked by running into a train ahead.

One object of our invention is to provide an improved angle cock device having means for maintaining communication through the brake pipe of a train, even if the plug valve is in closed position.

Another object of our invention is to provide an improved angle cock device having manually operable means, whereby the connection through the angle cock can be temporarily closed, when required, but after a limited time the connection through the brake pipe will be automatically opened again.

As shown in the drawing, the single figure is a plan view, partly sectioned, of an angle cock device embodying our invention.

According to the drawing, the angle cock device comprises a casing having a passageway 1 adapted to be connected to the usual brake pipe and a passageway 2 at an angle and adapted to be connected to the usual flexible hose.

Interposed between passageways 1 and 2 is a plug valve 3 having a central opening 4 for controlling communication between said passageways, and secured to the outer end of the plug valve is the usual handle 5 by which the plug valve can be turned.

According to our invention, the casing also contains a piston 6, forming at one side a chamber 7 connected to the atmosphere through port 8 and forming at the opposite side a chamber 9, said piston being adapted in its outward position to seal on a gasket 25.

The piston 6 has a valve portion 10, slidably fitted in a suitable chamber in the casing, and having a seat ring 11 formed at the lower end. The valve portion 10 is adapted to control communication between passage 12, which is connected to passageway 1 through the choke plug 13 and passage 14, which is connected through a choke plug 15 to the passageway 2. Outward movement of the piston 6 and valve portion 10 is opposed by the pressure of a spring 16 interposed between the piston valve portion 10 and the casing wall.

The casing also has a chamber 17, connected to the piston chamber 9 by a passage 18 and containing a valve 19, normally held seated by the pressure of a spring 20. The valve has a fluted stem 21 extending through an opening in the wall of the casing and at the outer end, the stem 21 is adapted to be fitted with a push button 22. A restricted passage 23 connects the piston chamber 9 to the passage 14 and a restricted passage 24 connects the passages 12 and 14.

In operation, with the plug valve 3 in the open position, as shown in the drawing, the brake pipe is charged through passageway 1, opening 4 in the plug valve 3 and passageway 2, in the usual manner.

Fluid under pressure in the passageway 1 flows through the choke plug 13, passage 12, and restricted passage 24 into passage 14 and also from passageway 2 through choke plug 15 into passage 14 and then through the restricted passage 23 into piston chamber 9 and from said chamber through passage 18 into valve chamber 17. With the valve 19 seated, as shown in the drawing, a pressure builds up in chamber 9 and acts on the piston 6. When the pressure in chamber 9 becomes sufficient to overcome the pressure of the opposing spring 16, the piston 6 and valve portion 10 are shifted outwardly until the piston seals on the gasket 25 and the valve portion 10 uncovers the passage 14, thereby connecting the passages 12 and 14 through the valve portion chamber.

If the plug valve 3 is now turned to closed position, in which position, communication between passageways 1 and 2 through the central opening 4 in the plug valve is closed, said passageways are still connected through the choke plug 13, passages 12 and 14 and choke plug 15, so that service applications and release of the brakes can be effected on the whole train in the usual manner, and even an emergency application of the brakes may be made on the whole train in the usual manner.

If it is desired to cut off a car or a portion of a train in which the brake system is charged, the handle 5 of the angle cock devices on the ends of the two adjoining cars, where the uncoupling is to be effected, is turned, so as to close the connection between passageways 1 and 2 through the central opening 4 in the plug valve 3. The valve 19 in both angle cock devices is then unseated by pressing the push button 22, thereby permitting the fluid under pressure in valve chamber 17 to be vented to the atmosphere past the fluted stem of the valve. Piston chamber 9 being connected to the valve chamber 17 by passage 18, the fluid under pressure in chamber 9, acting on the piston 6, is also vented to the atmosphere, and permits spring 16 to shift the piston 6 and valve portion 10 to the position shown on the drawing, in which position passages 12 and 14 are disconnected, except through the restricted port 24.

After the pistons 6 are shifted to the position shown on the drawing, the valve 19 in only one of the angle cock devices is held unseated, while the hose couplings are being uncoupled.

The valve 19 in one of the angle cock devices is held unseated until the hose couplings are uncoupled, so as to prevent the fluid under pressure flowing through the restricted passage 24 from operating the piston 6 to reconnect the passages 12 and 14 prior to accomplishing the uncoupling operation.

After the hose couplings are uncoupled between the cars, the valve 19 is allowed to seat. There will then be a flow of fluid under pressure to the atmosphere from the brake pipe by way of the restricted port 24 and the open end of the hose coupling. However, the rate of said flow is such as to have substantially no influence on the brake operation.

If a train is uncoupled and then recoupled and the trainman neglects to open the angle cock device on the end of each car, where the recoupling is made, then the flow of fluid under pressure through the restricted passage 24, passage 14, and restricted passage 23 will gradually build up a pressure in piston chamber 9 and shift the piston 6 and valve portion 10 to their outward position and thus connect the passages 12 and 14 through the valve portion chamber, so as to permit normal brake operation.

The two choke plugs 13 and 15 provide a means for retarding the exhaust of fluid under pressure from the piston chamber 9 when a sudden reduction in brake pipe pressure is effected to produce an emergency application of the brakes. The piston 6 and valve portion 10 are thereby held in their outward position a sufficient time to permit a sufficient decrease in the pressure in the brake pipe to the rear of the closed angle cock to ensure a full application of the brakes.

It will be noted that in the outward position of the piston 6, the piston seals on a gasket 25. This is desirable, so as to prevent unnecessary leakage from the piston chamber 9 and the brake pipe to the piston chamber 7 and then to the atmosphere through the passage 8.

Having now described our invention, what we claim as new and desire to secure by Letters Patent, is:—

1. An angle cock device having a brake pipe controlling valve and provided with a by-pass around said valve, valve means subject to brake pipe pressure for controlling communication through said by-pass, and a manually operable valve for venting fluid under pressure from said valve means.

2. An angle cock device having a brake pipe controlling valve and provided with a by-pass around said valve, valve means operated by brake pipe pressure for opening communication through said by-pass, and a manually operable valve for venting fluid under pressure from said valve means to permit said valve means to close communication through said by-pass.

3. An angle cock device having a brake pipe controlling valve and provided with a by-pass around said valve, a valve for controlling communication through said by-pass, a piston operated by brake pipe pressure for opening said valve, and a manually operated valve for venting fluid from said piston to effect the operation of said piston and said by-pass valve to close communication through said by-pass.

4. An angle cock device having a brake pipe controlling valve and provided with a by-pass around said valve, a valve device for controlling communication through said by-pass, and means for restricting the flow of fluid through said by-pass.

5. An angle cock device having a brake pipe controlling cock, a passage around said cock for establishing communication from one side of the cock to the other, a valve for controlling communication through said passage, said passage having a restricted port opening to one side of the brake pipe controlling valve.

6. An angle cock device having a brake pipe controlling cock, a passage around said cock for establishing communication from one side of the cock to the other, a valve for controlling communication through said passage, said passage having a restricted port opening to one side of the cock and a restricted port opening to the other side of the cock.

7. An angle cock device having a brake pipe controlling cock, a passage around said cock for establishing communication from one side of the cock to the other, a valve for controlling communication through said passage, a piston for operating said valve, and a restricted port connecting said passage to one side of said piston.

8. An angle cock device having a brake pipe controlling cock, a passage around said cock for establishing communication from one side of the cock to the other, a valve for controlling communication through said passage, a piston for operating said valve, a restricted port for supplying fluid from said passage to one side of said piston, and a manually operable valve for venting fluid from said piston.

9. An angle cock device having a brake pipe controlling cock, a passage around said cock for establishing communication from one side of the cock to the other, a valve for controlling communication through said passage, a piston for operating said valve, a restricted port for supplying fluid from said passage to one side of said piston, and a manually operable valve for venting fluid from said piston at a greater rate than fluid is supplied thereto through said restricted port.

10. An angle cock device having a brake pipe controlling cock, a passage around said cock for establishing communication from one side of the cock to the other, a valve for controlling communication through said passage, a piston for operating said valve, and a restricted port establishing a communication through said passage around said valve.

In testimony whereof we have hereunto set our hands.

CLYDE C. FARMER.
THOMAS H. THOMAS.